Dec. 31, 1929.  C. Y. KNIGHT  1,741,994
INTERNAL COMBUSTION ENGINE
Filed Feb. 18, 1922    5 Sheets-Sheet 3
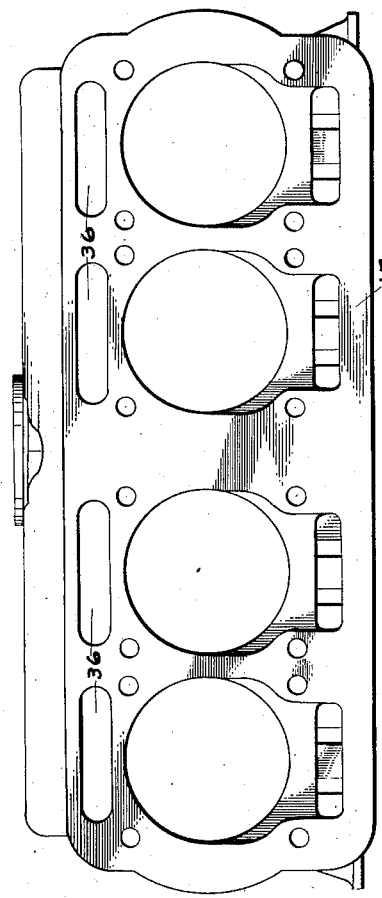
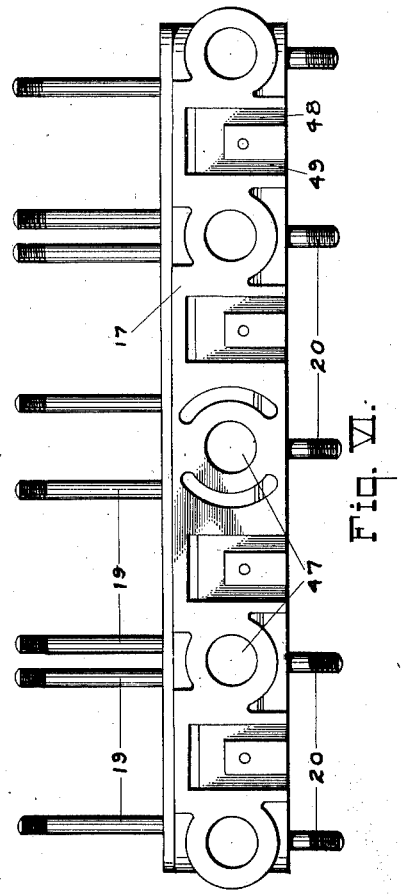
INVENTOR.
Charles Y. Knight.
BY
ATTORNEYS.

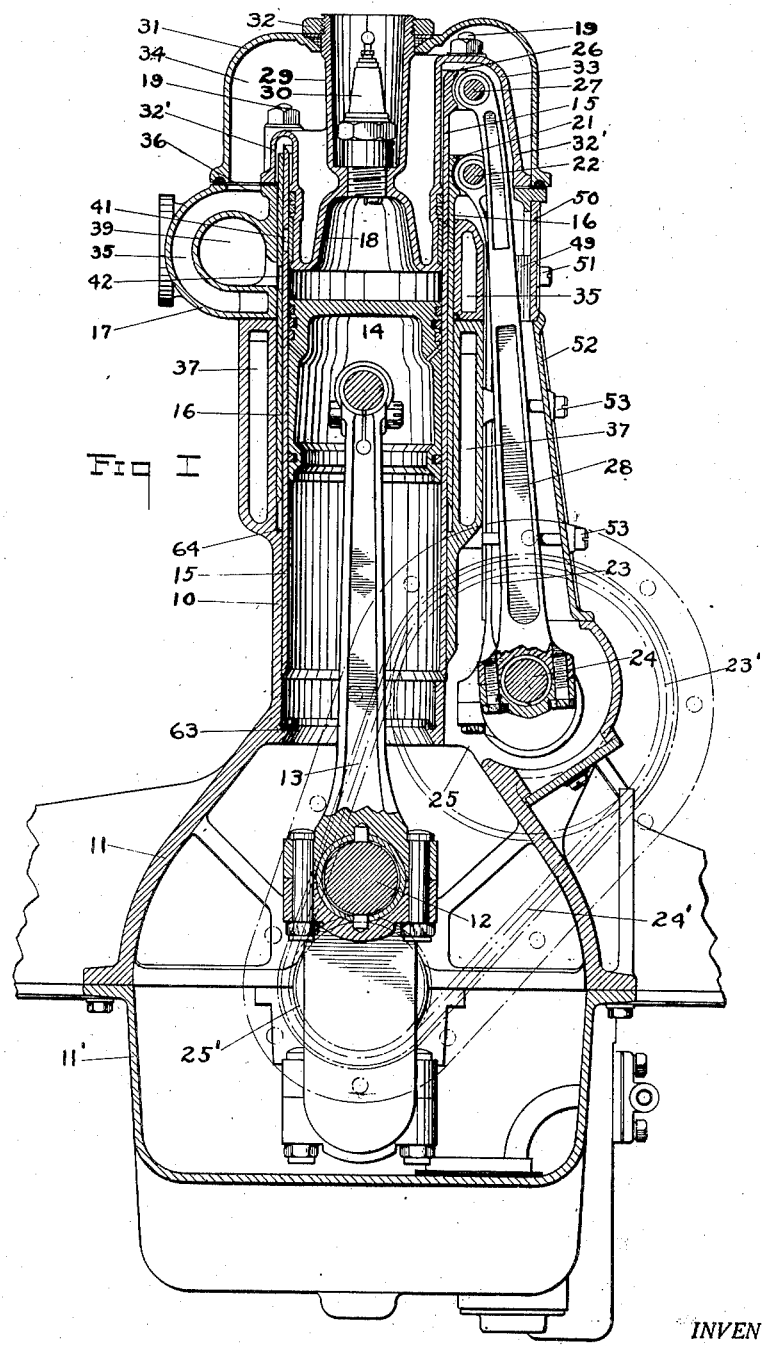

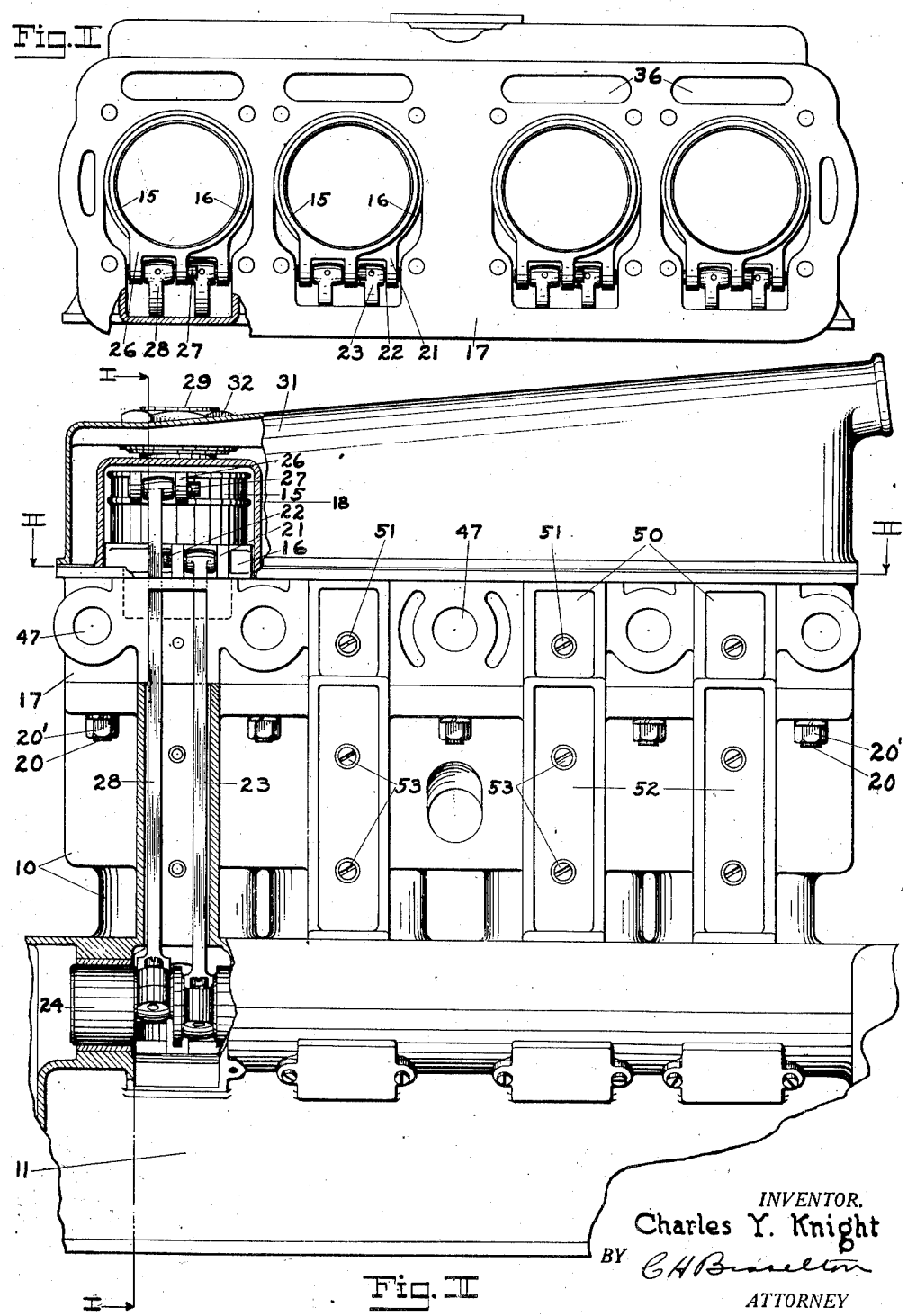

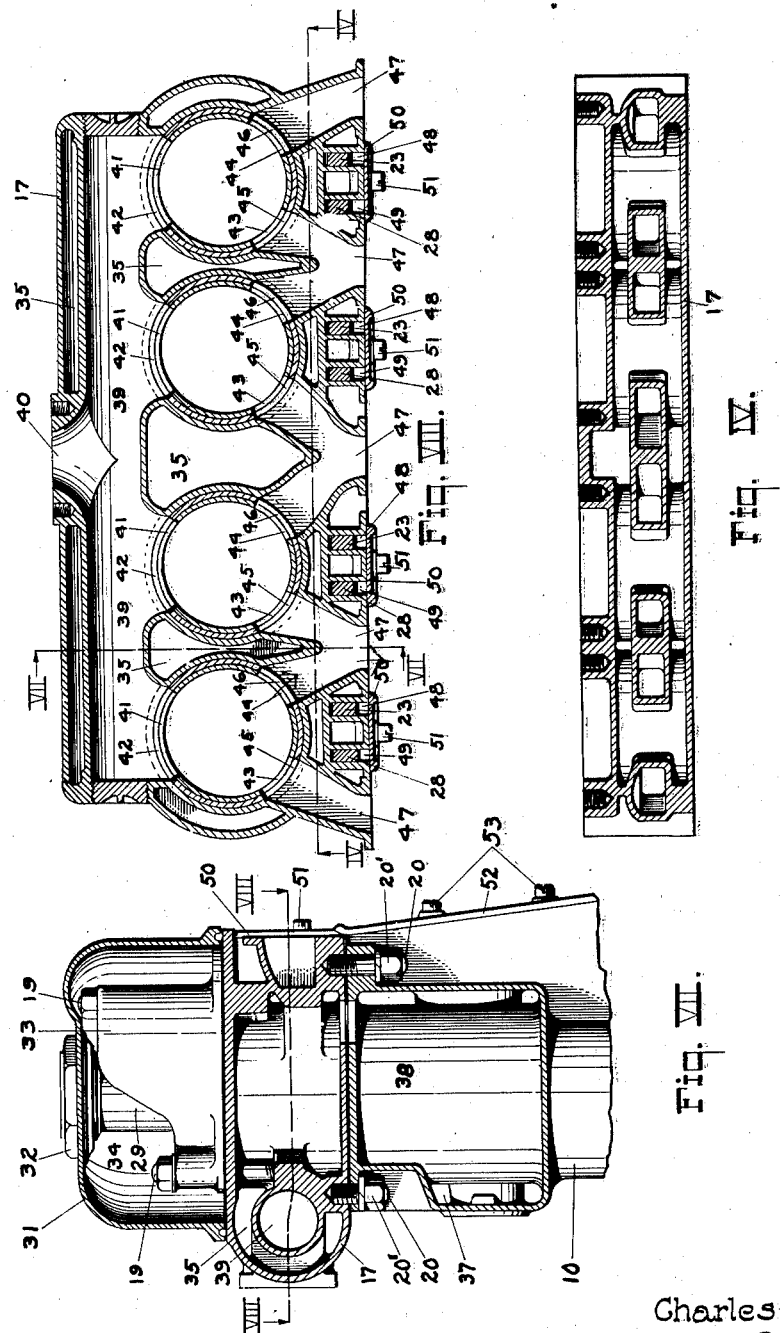

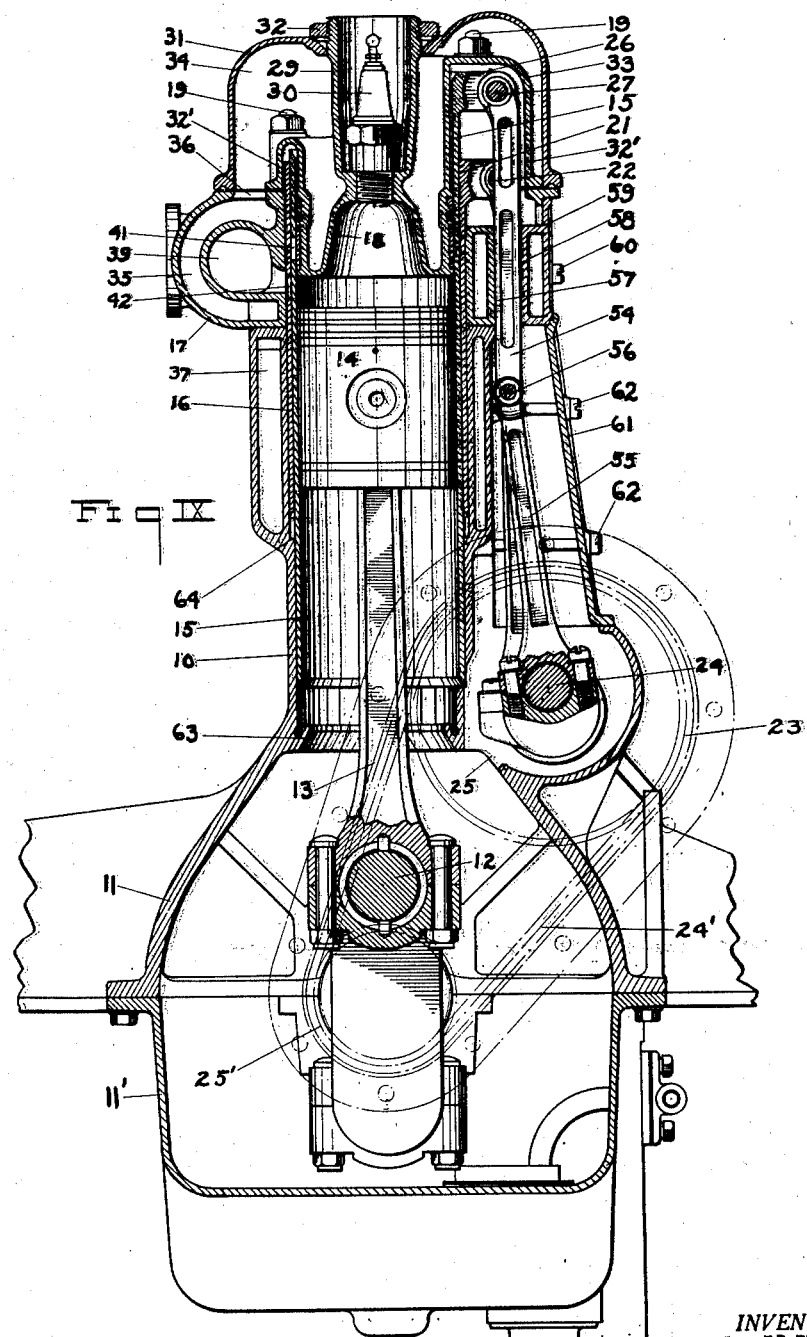

Patented Dec. 31, 1929

1,741,994

UNITED STATES PATENT OFFICE

CHARLES Y. KNIGHT, OF PASADENA, CALIFORNIA, ASSIGNOR TO KNIGHT AMERICAN PATENTS COMPANY, OF CHICAGO, ILLINOIS, A CORPORATION OF DELAWARE

INTERNAL-COMBUSTION ENGINE

Application filed February 18, 1922. Serial No. 537,376.

My invention relates to internal combustion engines of the sleeve valve type and has for its object to provide improved actuating means for the valves.

Another object of the invention is to provide an engine of the sleeve valve type constructed in a manner to prevent excessive lubrication of the valves at points adjacent the intake and exhaust ports due to oil being drawn up from the crank case by suction produced during the rapid passage of the gases through said ports when the engine is in operation.

Another object of the invention is to construct a sleeve valve motor in such a manner as to permit the valves to be withdrawn through the top of the cylinder to avoid disturbing the crank shaft, pistons, connecting rods and other related parts.

A further object of the invention is to provide an engine of the sleeve valve type, constructed in such a manner as to prevent the dropping of the valves into the crank case in the event of breakage of the parts supporting the same.

Another object of the invention is to provide an internal combustion engine of the sleeve valve type having improved means for actuating the sleeves to reduce to a minimum the lateral thrust thereon due to the angular disposition of the connecting rods for operating the same.

Another object of the invention is to provide means for cooling the inner sleeve independently of the water jacket.

Another object of the invention is to provide an internal combustion engine constructed in an improved manner to permit of the use of relatively light material in the cylinders and other parts, in combination with a different or relatively heavy material at the point of exhaust of the gases from the cylinders.

Another object of the invention is to provide an engine in which the crank case and main body of the cylinder is constructed of aluminum with a removable intake and exhaust block constructed of cast iron or other suitable metal.

To these and other ends the invention embodies the novel features of construction and combination of parts shown and described and is intended to cover such modifications thereof as may fall within the scope of the appended claims.

One embodiment of the invention is illustrated in the accompanying drawings in which:

Figure I is a sectional elevation of an engine embodying the invention, the section being taken on line I—I of Figure III.

Figure II is a sectional plan taken on line II—II of Figure III.

Figure III is a side elevation of the engine shown in section to more clearly illustrate the sleeve and connecting rod arrangement.

Figure IV is a sectional elevation taken on line IV—IV of Figure VIII.

Figure V is a detail plan view of the intake and exhaust block shown in Figure IV.

Figure VI is a side elevation of the same.

Figure VII is a sectional elevation taken on line VII—VII of Figure VIII.

Figure VIII is a sectional plan taken on line VIII—VIII of Figure VII with the sleeve valves in such position as to cause the intake and exhaust ports thereof to register with the corresponding openings in the cylinder walls.

Figure IX is a sectional elevation of an engine embodying a slightly modified form of the invention.

In the building of sleeve valve motors it is of considerable advantage to construct the same in such a manner as to permit of the quick and ready removal of the valves from the cylinders, and it is the object of the present invention to mount the valves in such a manner as to permit of their removal from the top of the cylinders rather than from the bottom as has been done in the past. It has been customary heretofore in the construction of certain types of engines having overhead valves to place the cam shaft for operating the same at the top of the cylinders, but the disadvantage of this idea lies in the fact that a special lubricating system and separate power is required to actuate the mechanism in this position. I propose in the construction of sleeve valve motors to place the eccentric shaft in the normal position where it may be lubricated by the splash method from the oil thrown in by rotation of the crank shaft within the crank case and further to extend the connecting rods from said eccentric shaft to the lugs on the sleeves at a point above the top of the cylinder, thus doing away with the necessity of multiplying the number of parts and the consequent cost of the same. In extending the connecting rods up to the top of the cylinder, their length is of course greatly increased and consequently they work at a much less angle and with much less thrust and are slower in action than when connected to the sleeves at the bottom of the cylinders as has been customary heretofore.

In sleeve valve engines, particularly of the double sleeve type, considerable difficulty lies from over lubrication of the valves around the exhaust ports from the fact that the vacuum produced in the top of the cylinder or the rapid movement of the gases through the intake and exhaust ports has a tendency to draw the lubricating material to these points upwardly from the crank case of the engine between the walls of the sleeves and the cylinder. By reason of this fact excessive lubrication prevails in proportion to the distance between the intake ports and the bottom of the working cylinder, which distance in the ordinary type of sleeve valve motor is determined by the length of the stroke and the space required for the operation of the lugs on the lower ends of the sleeve valves. In order to overcome this difficulty and to restrict the amount of oil drawn up between said sleeves, I have inverted the valves 20 that the mechanism necessary for operating the same is attached to the top thereof rather than to the bottom. In this construction the bottom of the sleeves do not at any time project below the bottom of the cylinder and consequently they operate at a greater distance above the crank case and furthermore their outer surfaces are not at any time subjected to the splash of the oil from the crank case.

This construction also has the advantages of permitting the opening in the bottom of the cylinder to be considerably reduced, which tends to reduce the amount of oil which will be splashed into the cylinders. In this new construction only one of the sleeves extends to a point adjacent the bottom of the cylinder, thereby minimizing the possibility of the passage of lubricants as far up as the intake and exhaust ports of the engine, and thus decreasing the amount of carbon which may be produced by the burning of oil around the exhaust ports.

It is further desirable in the production of high speed engines for automobiles, aeroplanes and other purposes, to use as much light material as possible in order to bring the weight of the engine down to the minimum. It is impractical to attempt to construct the entire cylinder of aluminum since it has been found that the difference in expansion between the aluminum and the material used in the construction of the valves causes the aluminum to expand away from the valves due to the excessive heat produced by the explosives. The objection to a construction of this kind is that the exhaust gases are permitted to find their way between the valves and the cylinder and the deposit of carbon upon the surface of the aluminum jacket causes friction between the valves and cylinders which is particularly objectionable as it makes the engine more difficult to start and tends to decrease its efficiency in other ways. In order to obtain the advantages of a light cylinder, I propose to carry the aluminum approximately up to the point of the intake and exhaust ports and above this point to construct the cylinder of cast iron or other suitable material so that the cylinder walls at the point where the greatest heat occurs will be of the same material as that of the valves, thereby reducing to a minimum the relative amount of expansion between these parts. It is apparent that in the ordinary constructions, the inner sleeve which is exposed to the heat of the explosive charge during the entire working stroke, is inadequately cooled, being more remote from the water jacket than the outer sleeve. I have provided the inner sleeve with a depending skirt which contacts with the wall of the cylinder, thus permitting direct transfusion of heat through the cylinder wall to the atmosphere.

Referring to the drawings, 10 represents a cylinder having an enlarged base portion 11 forming the upper half of the crank case and a removable pan 11' forming the lower half of the same. The crank shaft 12 is mounted within the crank case and provided with a plurality of connecting rods 13 having pistons 14 thereon. Reciprocally mounted within the cylinder are the inner and outer sleeve valves 15 and 16 respectively, the upper ends of which project through a detachable intake and exhaust block 17 forming a part of the cylinder to which is connected a plurality of removable cylinder heads 18 secured to the block by means of bolts 19 as shown in Figure 1, said intake and exhaust block being detachably secured to the upper end of the main body of the cylinder by means of the screws or studs 20 as indicated in Figure VII, the nuts 20' of the studs being removable to permit the block 17 to be taken off without removing the studs.

The outer sleeve 16 at its upper end, is provided with a pair of lugs 21 carrying a pin 22 with which is connected the upper end of the valve operating rod 23, the lower end being connected with an eccentric shaft 24 mounted adjacent the bottom of the cylinder and adapted to be lubricated preferably by the splashing of oil from the crank case through the opening 25 located adjacent the bottom of the cylinder, said eccentric shaft being provided with a gear 23' driven by a chain 24' meshing with a gear 25' on the crank shaft 12. The inner sleeve 15 is provided at its upper end with a pair of lugs 26 carrying a pin 27 with which is connected the upper end of the connecting rod 28, the lower end of which is connected with the eccentric shaft 24 as shown in Figure 1. The eccentric shaft 24 may, if desired, be connected with and driven by the crank shaft 12 by means of a system of gears (not shown) or in any other preferred manner. The cylinder heads 18 are provided with upwardly extending tubular portions 29 in which are mounted the spark plugs 30, said tubular portions projecting through the cover 31 of the engine which is clamped upon the upper face of the intake and exhaust block 17 by means of the nuts 32 screwed down upon the tubular portions 29 of the heads into engagement with the cover 31 as indicated in Figure 1. Each of the heads is of cylindrical construction as indicated in Figures I and III and each is provided with a downwardly extending outer rectangular wall 32' the lower edge of which is disposed upon the upper face of the cylinder block 17 to form a liquid-tight joint therewith. Each head on the side upon which the connecting rods are disposed, is carried up a considerable distance above its highest point on the opposite side as indicated at 33 in Figures I and II whereby space is provided for the free movement of the upper end of the connecting rods and that portion of the sleeves to which they are connected. The cooling chamber 34 formed by the cover 31 is at all times in communication with the chamber 35 of the cylinder block 17 by way of the openings 36 and the chamber 35 is likewise in communication with the chamber 37 surrounding the upper end of the main body portion of the cylinder by way of the openings 38 as shown in Figure VII.

From this construction it will be seen that the upper ends of the valves are surrounded on all sides by a cooling medium whereby they are well protected from the excessive heat to which they are subjected.

The gas inlet chamber 39 having a central inlet opening 40 is also surrounded by a cooling medium and the gas is fed from said chamber to the cylinder through the inlet ports 41 and 42 of the inner and outer sleeve valves respectively while the burnt gases are discharged through the double ports 43 and 44 and 45 and 46 of the inner and outer sleeves respectively and thence pass through the exhaust passageways 47 to the exhaust manifold (not shown).

The connecting rods 23 and 28 for the outer and inner sleeves are adapted to move in guideways 48 and 49 respectively as shown in Figure VIII, and are thereby prevented from shifting laterally and consequently prevent the shifting of the valves during their up and down movement in the cylinders. The guideways are protected by cover plates 50 secured to the cylinder section 7 by means of the screws 51. Cover plates 52 are located beneath the cover plates 50 and secured by means of the screws 53, said cover plates being removable in order that the connecting rods may be readily inspected.

The modification shown in Figure IX is the same as that shown in Figure I, except that the connecting rods are divided into the upper and lower halves 54 and 55 which are pivotally connected by means of the pins 56, the upper halves being adapted to move in a straight line by being guided between the inner and outer walls 57 and 58 respectively, of the detachable cylinder section 17 the wall 58 being preferably constructed as a part of the removable cover plate 59 secured by means of the screws 60 and provided with a water space communicating with the water jacket of the casting 17. A removable cover plate 61 secured by the screws 62 is preferably extended substantially the full length of the engine as is the plate 59 and with this construction the walls beneath the cover plates 52 in Figure III may be omitted.

From this modified construction it will be seen that there is no side thrust upon the sleeve valves during the operation thereof for the reason that the upper portions of the connecting rods are prevented from shifting or moving laterally of the cylinders by means of the guides between which they travel.

In order to remove the sleeves from any one of the cylinders of the engine it is only necessary to unscrew the nuts 32 to permit the cover 31 to be taken off after which the bolts 19 may be unscrewed to permit each head to be separately removed if desired and by removing the connecting rod pins 22 and 27 the inner and outer sleeves both may be withdrawn from the cylinder without removing the piston therefrom. The section 17 of the cylinder may then be taken off by simply unscrewing the nuts 20' from the studs 20 shown in Figure VII.

The cylinder is provided at the bottom thereof with an inwardly extending annular flange 63 adapted to form a stop for the sleeve 15 in the case of the breaking of the connecting rod or pin supporting the same. The upper end of the cylinder is bored larger than the lower end to accommodate the outer sleeve 16 and at the bottom of the upper bore is a shoulder 64 which will serve as a stop for said sleeve should the lugs thereon or the connecting rod or connecting rod pin become broken. This form of cylinder and valve construction also serves to minimize the possibility of excessive lubrication of the exhaust ports and consequently reduces the amount of carbon accumulating at these points thus considerably increasing the efficiency of the engine.

It will be seen from the construction shown in Figure I that the aluminum cylinder jacket extends up to a point very close to the exhaust ports of the engine and that the cast iron block having the intake and exhaust ports is superposed upon an detachably connected with the lower part of the engine, and forms a part thereof. By constructing the cylinder in this manner I provide a motor of extremely light construction without sacrificing any of the advantages derived from the present forms of successfully operated engines for at the point of exhaust where the heat is greatest I use like metals such as cast iron, both in the valves and the section of the cylinder through which the burnt gases escape. Consequently there is no unequal expansion and contraction of the parts at this point to increase the openings between the sleeves and cylinder wall for the admission and accumulation of carbon, which, as is well understood, causes serious trouble and greatly decreases the efficiency of the engine. However, aside from the fact that I prefer to make the main body of the cylinder of aluminum, in construction of aeroplane and other types of engines, it will be understood that regardless of what material is used, considerable advantage is derived from making the top of the cylinder detachable in the manner shown since it may be quickly removed for the purpose of cleaning without disturbing the crank shaft or pistons.

Another advantage of this construction lies in the fact that as this part of the cylinder is necessarily more complicated than the lower part, better castings can be obtained by casting it separately and in the case of defective castings the loss is not as great as if the whole cylinder had to be scrapped.

The advantages of operating the sleeve valves from the top of the cylinders will be apparent. It will be noted that this is done without placing the eccentric or cam shaft at the top of the cylinder, as has been done in puppet valve engines, thereby overcoming the difficulties of lubricating the eccentric shaft at this point. In the present construction the connecting rod moves at a much less angle than in the previous types of sleeve valve engines and consequently the side thrust upon the sleeves is so diminished as to be almost negligible. Furthermore the comparative ease with which any particular cylinder head may be removed independently of the others affords a great advantage in case of repairs.

It will be apparent that the invention shown and described herein is susceptible of various modifications, embodiments and arrangements to suit special or varying conditions and I wish it to be understood that the terms which I have used are merely descriptive and not limiting and that it is my intention to include any and all modifications which come within the scope of the invention as defined in the appended claims.

Having described the invention what I desire to secure by Letters Patent, is:

1. In a reciprocating engine, a cylinder comprising a main body portion and a detachable outer end portion having intake and exhaust passageways therein, and a head projecting inwardly into the cylinder and ending short of said passageways and removably connected with said detachable end portion.

2. In a reciprocating engine, a cylinder comprising a main body portion and a detachable outer end portion having intake and exhaust passageways therethrough, a head projecting inwardly into the cylinder and ending short of said passageways and removably connected with said detachable end portion and a cover for said head forming therewith a water jacket also removably connected with said outer end portion.

3. In a reciprocating engine, a cylinder comprising a main body portion and a detachable outer end portion having inlet and exhaust passageways therein with a water jacket surrounding the same, a head for the cylinder removably connected with said detachable end portion and a removable cover for the head also connected with said detachable end portion to form a water jacket around the head in communication with the first mentioned water jacket.

4. In a reciprocating engine, a cylinder comprising a main body portion and a detachable outer end portion having inlet and exhaust passageways leading to and from the combustion chamber with communicating water jackets substantially surrounding said chamber, a head for the cylinder removably connected with said detachable end portion and a cover spaced from the head and removably connected with said detachable end portion to afford a water space around the head in communication with said water jackets.

5. In a reciprocating engine, a cylinder comprising a main body portion and a detachable outer end portion having inlet and exhaust passageways leading to and from the combustion chamber, a cover removably connected with said end portion, a head, connected with the cover and removably disposed upon said end portion and having a body portion for closing the same and a downwardly extending portion spaced from the body portion to form a recess within the head, sleeve valves projecting through said end portion into the recessed portion of the head, and valve operating means projecting upwardly into said recessed head and operatively connected with the valves.

6. In a reciprocating engine, a cylinder comprising a main body portion and a detachable outer end portion having inlet and exhaust passageways leading to and from the combustion chamber, a cover removably connected with said end portion, a head connected with the cover and removably disposed upon said end portion and having a body portion for closing the same and a downwardly extending portion spaced from the body portion to form a recess within the head, sleeve valves projecting through said end portion into the recessed portion of the head and connecting rods guided by said outer end portion and projecting upwardly into said recessed head and connected with said valves.

7. In a reciprocating engine, a cylinder having a larger bore at its outer end and a smaller bore ending short of its inner end to form a flange, sleeve valves corresponding to said bores and disposed therein, a piston reciprocably mounted within the smaller sleeve and means for actuating said piston and said sleeves.

8. In a reciprocating engine, a cylinder having its outer portion bored larger than its inner portion and having an inwardly turned flange at its inner end, sleeve valves corresponding to said bores and disposed therein, said valves having their outer ends projecting through the outer end of the cylinder, a piston within the smaller sleeve, means for actuating said piston, an eccentric shaft, and connecting rods connecting the outer ends of the sleeves to said eccentric shaft.

9. In a reciprocating engine, a cylinder provided with a restricted inner end and a separate outer end and having intake and exhaust ports leading to and from said outer end, a piston within the cylinder, sleeve valves within the cylinder and forming a cylinder lining for said piston for controlling said intake and exhaust ports and completely separating said piston from the wall of said cylinder, said valves ending short of said restricted end and means for actuating said piston and said valves.

10. In a reciprocating engine, the combination of a cylinder comprising detachable sections constructed of different metals, one of said sections being provided with inlet and exhaust ports, sleeve valves of the same material as said last mentioned cylinder section movable within said sections and contacting therewith, the other section being provided with a downwardly extending portion projecting into said sleeve valves, a piston movable within the valves, and means for actuating said piston and said valves.

11. In a sleeve valve motor, a cylinder having a bore of larger diameter, for part of its length, and a bore of smaller diameter for the rest of its length, a sleeve fitting each bore, said sleeves telescoping one within the other in the bore of greater diameter, said cylinder being provided with means for cooling the cylinder parts adjacent the larger diameter bore to a greater extent than the small diameter bore.

12. In a sleeve valve motor, a cylinder head, a piston, a crank case, sleeve valves slidable between said piston and said cylinder, said cylinder and sleeve having inlet and exhaust passages, an eccentric shaft in said crank case for controlling said sleeves, and connecting rods, one for each sleeve, extending from said eccentric shaft to and connected to the upper ends of said sleeves above the acting edge of said piston head.

13. In a sleeve valve motor, a cylinder, a piston in said cylinder, sleeve valves between the said piston and cylinder, a crank case, said cylinder and sleeve valve having inlet and exhaust openings, an eccentric shaft in said crank case for controlling said sleeves, connecting rods one for each sleeve valve extending from said eccentric shaft to and connected to the upper ends of said sleeve valves, and guides for said connecting rods.

14. In a sleeve valve motor, a cylinder, a piston in said cylinder, a crank case, sleeve valves between said piston and cylinder, lugs one on the upper end of said sleeve valve, an eccentric shaft in said crank case for controlling said sleeve valves, and connecting rods one for each sleeve valve extending from said eccentric shaft to its respective lug.

15. In a sleeve valve motor, a cylinder, a piston in said cylinder, a crank case, sleeve valves between said piston and cylinder, a chamber at the upper end of and one side of said cylinder, an eccentric shaft in said crank case for controlling said sleeve valves, and connecting rods, one for each sleeve valve, extending from said eccentric shaft into said chamber and connected to the upper end of the respective sleeve valve.

16. In a reciprocating engine, a crank case, a cylinder thereon provided with an inwardly extending projection adjacent its inner end, a sleeve valve within the cylinder above said projection, the said projection being adapted to prevent the dropping of said sleeve valve into the crank case, a piston mounted within said sleeve, and means for actuating the said valve with movements of said piston to limit the movement of the piston to within the valve.

17. In a reciprocating engine, the combination comprising a cylinder, a detachable block member having inlet and exhaust ports therein, sleeve valves mounted within said cylinder and projecting into the said block member, said valves having ports therein adapted to register with the inlet and exhaust ports of said block member, a detachable cylinder head disposed upon said block member and extending downwardly therefrom to within said sleeve valves, and means for actuating the said valves in timed relation with the movements of said piston.

In testimony whereof I affix my signature.

CHARLES Y. KNIGHT.